(12) United States Patent
Al-Dossary et al.

(10) Patent No.: US 10,310,112 B2
(45) Date of Patent: Jun. 4, 2019

(54) PROCESSING GEOPHYSICAL DATA USING 3D NORM-ZERO OPTIMIZATION FOR SMOOTHING GEOPHYSICAL INVERSION DATA

(71) Applicant: Saudi Arabian Oil Company, Dhahran (SA)

(72) Inventors: Saleh Al-Dossary, Dammam (SA); Jinsong Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 383 days.

(21) Appl. No.: 14/667,424

(22) Filed: Mar. 24, 2015

(65) Prior Publication Data
US 2016/0282489 A1 Sep. 29, 2016

(51) Int. Cl.
*G01V 1/28* (2006.01)
*G01V 1/30* (2006.01)
*G01V 1/36* (2006.01)

(52) U.S. Cl.
CPC .............. *G01V 1/282* (2013.01); *G01V 1/302* (2013.01); *G01V 1/306* (2013.01); *G01V 1/364* (2013.01); *G01V 2210/48* (2013.01); *G01V 2210/66* (2013.01)

(58) Field of Classification Search
None
See application file for complete search history.

(56) References Cited

U.S. PATENT DOCUMENTS

| 5,838,634 A | 11/1998 | Jones et al. |
| 6,230,101 B1 | 5/2001 | Wallis |
| 7,184,367 B2 | 2/2007 | Yin |
| 8,428,925 B2 | 4/2013 | Krebs et al. |
| 8,442,770 B2 | 5/2013 | Bruun et al. |
| 8,521,488 B2 | 8/2013 | Kirby et al. |
| 2006/0122780 A1* | 6/2006 | Cohen .................... G01V 1/288 702/14 |

(Continued)

FOREIGN PATENT DOCUMENTS

| WO | WO2010039757 | 4/2010 |
| WO | WO2013150464 | 10/2013 |

OTHER PUBLICATIONS

International Search Report and Written Opinion of the International Searching Authority issued in Interantional Application No. PCT/US2015/056361 dated Feb. 10, 2016; 14 pages.

(Continued)

*Primary Examiner* — Shaun M Campbell
(74) *Attorney, Agent, or Firm* — Fish & Richardson P.C.

(57) ABSTRACT

The present disclosure describes methods and systems, including computer-implemented methods, computer program products, and computer systems, for processing geophysical data. One computer-implemented method includes obtaining a set of raw geophysical data, wherein the raw geophysical data include 3-Dimensional (3D) coordinates; grouping, by a data processing apparatus, the set of the raw geophysical data into a plurality of subsets; and processing, by the data processing apparatus, each subset of the raw geophysical data using a 3D norm zero objective energy function to generate a subset of smoothed geophysical data, wherein the smoothed geophysical data is used to build a subsurface model.

11 Claims, 14 Drawing Sheets

(56) References Cited

U.S. PATENT DOCUMENTS

| | | |
|---|---|---|
| 2010/0082724 A1 | 4/2010 | Diyankov et al. |
| 2010/0206559 A1 | 8/2010 | Sequeira, Jr. et al. |
| 2013/0336541 A1 | 12/2013 | Spencer et al. |
| 2015/0066374 A1* | 3/2015 | Ji .......................... G01V 1/364 702/17 |

OTHER PUBLICATIONS

He, Lei et al.; "Mesh Denoising via L O Minimization"; ACM Transactions on Graphics (TOG); vol. 31, No. 4; Jul. 1, 2013; pp. 64:1-64:7.

Wang, Qichao et al.; "Edge-Aware Volume Smooting Using L O Gradient Minimization"; Computer Graphics Forum; vol. 34, No. 3; Jun. 1, 2015; pp. 131-140.

Xu et al., "Image Smoothing via Lo Gradient Minimization", ACM Trans. Graph. 30, 6, Article 174, Dec. 2011, 12 pages.

Zhang et al., "Seismic Sparse-Layer Reflectively Inversion using Basis Pursuit Decomposition", Geophysics, vol. 76, No. 6, Nov.-Dec. 2011, R147-R158, 12 pages.

Wang et al., "A New Alternating Minimization Algorithm for Total Variation Image Reconstruction", SIAM J. Imaging Sciences, vol. 1, No. 3, Copyright 2008, pp. 248-272.

Gulf Cooperation Council Examination Report issued in GCC Application No. 2016-30816 dated May 30, 2018, 4 pages.

\* cited by examiner

PROCESSING GEOPHYSICAL DATA USING 3D NORM-ZERO OPTIMIZATION FOR SMOOTHING GEOPHYSICAL INVERSION DATA

BACKGROUND

In a geophysics inversion analysis, geophysical data is collected and analyzed to estimate the subsurface structure of the earth. Examples of geophysical data include impedance data, porosity data, and velocity data. In some cases, the geophysical data can be used to build a geographic model that assists in making drilling decisions.

SUMMARY

The present disclosure describes methods and systems, including computer-implemented methods, computer program products, and computer systems for processing geophysical data. One computer-implemented method for processing geophysical data includes obtaining a set of raw geophysical data, wherein the raw geophysical data include 3-Dimensional (3D) coordinates; grouping, by a data processing apparatus, the set of the raw geophysical data into a plurality of subsets; and processing, by the data processing apparatus, each subset of the raw geophysical data using a 3D norm zero objective energy function to generate a subset of smoothed geophysical data, wherein the smoothed geophysical data is used to build a subsurface model.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the raw geophysical data is at least one of impedance data, velocity data, or porosity data.

A second aspect, combinable with any of the previous aspects, wherein grouping the set of the raw geophysical data into a plurality of subsets includes determining geometry information for the set of the raw geophysical data; determining a memory size for processing a subset of the raw geophysical data by the data processing apparatus; and grouping the set of the geophysical data based on the geometry information and the memory size.

A third aspect, combinable with any of the previous aspects, wherein the geometry information includes a cross line direction of the raw geophysical data.

A fourth aspect, combinable with any of the previous aspects, wherein the 3D norm zero objective energy function is $$obj = \sum_{x=1}^{k}\left((d(x) - m(x))^2 + \lambda \cdot \sum_{i=1}^{3} C\left(\frac{\partial m(x)}{\partial x_i} \neq 0\right)\right),$$

where d(x) represents the subset of the raw geophysical data, k represents the number of the raw geophysical data in the subset, i represents the dimension of the raw geophysical data, m(x) represents the subset of the smoothed geophysical data, C( . . . ) represents a counting function, and λ represents a constant weight.

A fifth aspect, combinable with any of the previous aspects, wherein processing each subset of the raw geophysical data includes iteratively processing until an iterative condition is met, the iterative processing including computing an auxiliary value by solving a first sub energy function, wherein the first sub energy function is derived from the 3D norm zero objective energy function with a fixed value of an input data; computing a next input data by solving a second sub energy function, wherein the second sub energy function is derived from the 3D norm zero objective energy function with a fixed auxiliary value; and increasing a beta value that is included in the first and the second sub energy functions.

A sixth aspect, combinable with any of the previous aspects, wherein the iteration condition includes at least one of reaching a predetermined number of iterations or a beta value being over a predetermined threshold.

The subject matter described in this specification can be implemented in particular implementations so as to realize one or more of the following advantages. Using a 3D norm zero optimization process to smooth the raw data can enhance a seismic inversion image by removing noise and preserving the edges. This approach can provide a smooth model to better image complex geological structures. The resulted data model can help geological interpreters to build a more coherent reservoir model, improve drilling location accuracy, and save operational cost. The 3D norm zero optimization process described is also computation efficient because the solution uses a low term of multiplication and summation. Furthermore, the 3D norm zero function may be used as a global operator that may not be affected by local abnormality. In addition, the 3D norm zero function may not be limited by window sizes that may be required in algorithms using median filters. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
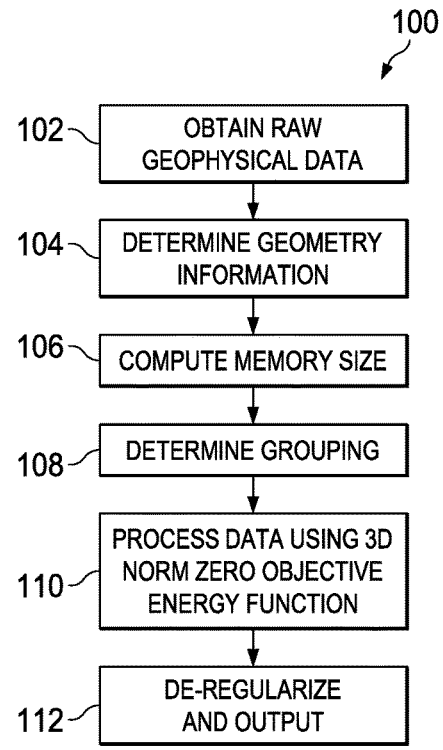
FIG. 1 illustrates an example 3D norm zero optimization method according to an implementation.

The following description is presented to enable any person skilled in the art to make and use the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes methods and systems, including computer-implemented methods, computer program products, and computer systems, for processing geophysical data. In seismic processing, geophysical data can be used to build geographic models of subsurface structures. In some cases, the geophysical data have the features of sparseness. These geophysical data can also be blocky and have natural edges. Examples of these geophysical data can include impedance data, porosity data, and velocity data. In these or other cases, the raw geophysical data can be processed by a computer system to optimize the smoothness of the data and, therefore, can provide a more accurate image for the development of geographic models. For example, velocity data can be used to determine seismic reflection through depth/time migration. The accuracy of the migration can depend on the accuracy of the velocity model, especially in a complex subsalt dome area. A smoothed velocity model can improve the migration image, and therefore can be used to build a more accurate reservoir model. In some cases, median filter or structure-oriented filter can be used to filter the raw data. However, these filters may not work well on geophysical data that represent blocky layered structure images.

A norm is a total size or length of all vectors in a vector space or matrices. A $n^{th}$ norm, denoted as $l_n$-norm, is defined as the $n^{th}$-root of a summation of all elements to the $n^{th}$ power. In some cases, $l_1$-norm is also referred to as Euclidean distance, and $l_2$-norm is also referred to as the Mean-squared Error. The following equation represents the definition of the $l_n$-norm for a group of vectors $x_i$:

$$\|x\|_n = \sqrt[n]{\sum_i |x_i|^n} \quad \text{Where } n\epsilon R(\text{Real number}) \tag{1}$$

The following represents a definition of norm-two, denoted as $l_2$, for a set of numbers that are denoted as x(t):

$$l_2 = \Sigma(x(t))^2 \tag{2}$$

The following represents a definition of norm-one, denoted as $l_1$ for x(t):

$$l_1 = \Sigma \|x(t)\| \tag{3}$$

In some cases, a norm zero optimization can be used to find the sparsest solution of a linear system. The norm zero optimization can also be referred to as the $l_0$-norm optimization or the $l_0$-optimization. A norm zero optimization can be applied to geophysical data, e.g., impedance, porosity, or velocity, or any data that presents layer or blocky structure image. Applying a norm zero optimization to geophysical data with sparseness feature can smooth the data and, therefore, produces better geophysical models. In a norm zero optimization, the $l_0$-norm of a vector can be minimized according to some constraints. The following represents an expression of the norm zero optimization problem: $\min\|x\|_0$ Subject to Ax=b.

In some cases, norm zero optimization can be used to determine the number of interfaces between lithological units based on a group of measured points. Initially, while the number of data points is much larger than the number of lithological units, every measured point could potentially be a major interface. The optimization procedure reduces the number of pseudo lithological interfaces from a large number to a smaller based on a least square error principle. A thicker lithological layer could contain hundreds of measured data points. Therefore, norm zero optimization can be used to smooth the data points and group them into segments to match the statistical characters of the layered earth model.

While $l_2$-norm is commonly used in the field of engineering and science, $l_0$-norm is much less applicable. Due to its complexity, $l_0$-norm is often difficult to solve practically. The following equation represents the definition of the $l_0$-norm for a group of vectors $x_i$:

$$\|x\|_0 = \sqrt[0]{\sum_i x_i^0} \tag{4}$$

To avoid the presence of zero$^{th}$-power and zero$^{th}$-root in the above definition, in some cases, an alternative definition of $l_0$-norm can be used. In the alternative definition, $l_0$-norm is defined to represent a total number of non-zero elements in a vector. The following equation represents the alternative definition of the $l_0$-norm for a vector x:

$$\|x\|_0 = \neq(i|x_i \neq 0) \tag{5}$$

The following represents a definition of norm zero, denoted as $l_0$:

$$l_0 = \Sigma C(x(t)) \tag{6}$$

Where the counting function C is represented as the following:

$$C(x) = \begin{cases} 1 & x \neq 0 \\ 0 & x = 0 \end{cases} \tag{7}$$

Unlike norm two, norm zero is not analytic. Therefore, its derivative cannot be obtained numerically. In some cases, norm zero optimization can be used to process 2-dimensional (2D) images. However, for geophysical data with 3-dimensional (3D) coordinates, a norm zero optimization for 2D data may not provide consistent images on cross line directions.

In some cases, a norm zero optimization process for 3D data can be used to smooth the raw geophysical data. The process can be applied on blocky structured geophysical data as an edge-preserving smoothing filter to build a better 3D model for geological interpretation. In some cases, as discussed in more detail in FIGS. 1-11 and associated descriptions, the geophysical data are obtained, segmented, and processed based on a 3D norm zero objective energy function. In some cases, the 3D norm zero objective energy function is solved by using a two-step iterative process. The two-step iterative process includes fixing an input data to solve for an auxiliary value, and fixing the auxiliary value to solve for the next input data. The optimization process enhances image resolution by removing low amplitude components while preserving sharp edges, thus providing better geological interpretation models. The optimization process is computation efficient on improving data quality.

FIG. 1 illustrates an example 3D norm zero optimization method 100 according to an implementation. For clarity of presentation, the description that follows generally describes method 100 in the context of FIGS. 2-11. However, it will be understood that method 100 may be performed, for example, by any other suitable system, environment, software, and hardware, or a combination of systems, environments, software, and hardware as appropriate. In some implementations, various steps of method 100 can be run in parallel, in combination, in loops, and/or in any order.

At 102, a set of raw geophysical data is obtained. In some cases, the raw geophysical data are 3D data that include 3D coordinates corresponding to a (x, y, z) coordinate system. In some cases, the data are stored in a Society of Exploration Geophysicists (SEG) format, e.g., the SEG-Y (SEGY) format.

Figure 2:
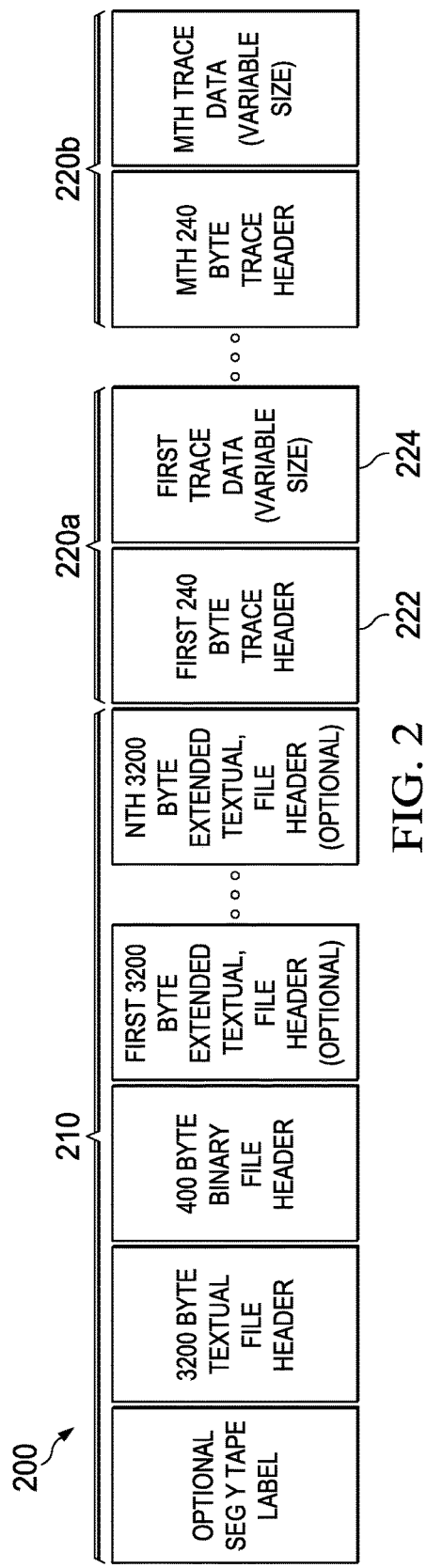
FIG. 2 is an example Society of Exploration Geophysicists-Y (SEGY) file 200 storing the raw geophysical data according to an implementation.

FIG. 2 is an example SEGY file 200 storing the raw geophysical data according to an implementation. The file 200 includes a file header 210 and one or more trace files 220*a-b*. The file header 210 can include an optional SEGY tape label, a textual file header, a binary file header, and one or more optional extended textual file headers. In some cases, the raw geophysical data are stored trace by trace. Each trace file, e.g., trace files 220*a-b*, can include a trace header 222 and a trace data 224. In some cases, the trace header 222 has 240 bytes. The trace header 222 can include the geometry information for the raw geophysical data in the trace. Examples of the geometry information include the inline number, the cross line number, sample rate, depth, and recorded time for the raw geophysical data. The trace data 224 can include the raw geophysical data in the trace.

Referring to FIG. 1, from 102, method 100 proceeds to 104, where the geometry information of the raw data are determined. The geometry information can include the inline number, the cross line number, sample rate, depth, or recorded time for the raw data. In some cases, the geometry information for the raw data in a trace can be determined based on a trace header of the trace in the SEGY file. From 104, method 100 proceeds to 106.

At 106, a memory size for performing the optimization process is determined. In some cases, the memory size includes the size of memory that the computer system can use to store a block of data, perform the computation procedures described in FIGS. 1-11 for the block of data, and output the data to a file. From 106, method 100 proceeds to 108.

At 108, the set of raw data is grouped into one or more blocks. In some cases, the set of raw data can include a large number of data. In these or other cases, the set of raw data can be grouped into a plurality of blocks. Each block of raw data can be processed together. This approach enables the optimization process to be performed by a computer system with limited memory and processing power. In some cases, the grouping can be determined based on the geometry information of the raw data determined at 104, the memory size for performing the optimization process determined at 106, or a combination of both. For example, as illustrated in FIG. 3, the grouping can be determined based on the cross line directions of the data and the memory size.

Figure 3:
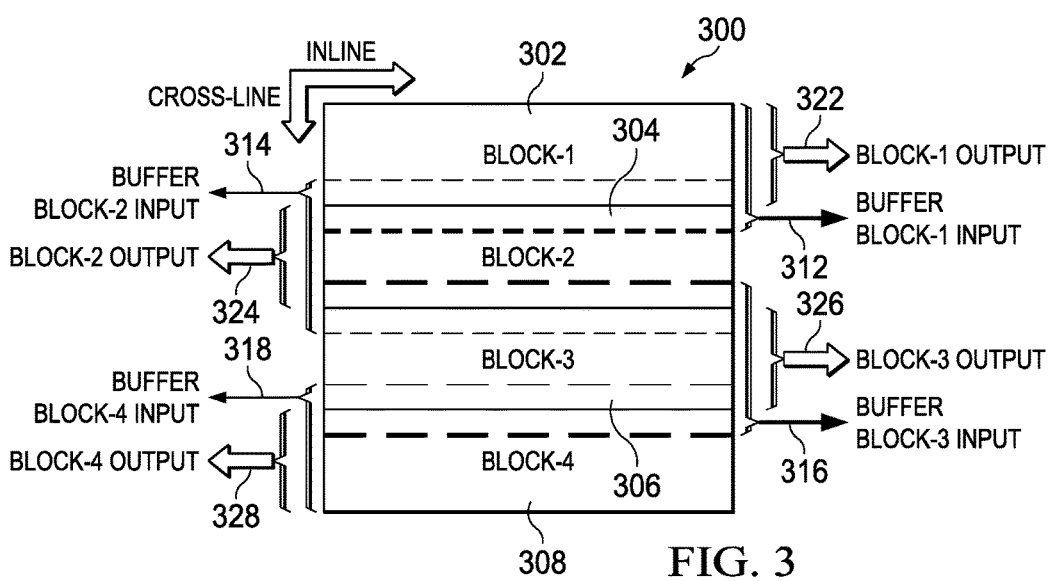
FIG. 3 is a block diagram of an example grouping for a set of raw geophysical data according to an implementation.

FIG. 3 is a block diagram 300 of an example grouping for a set of raw geophysical data according to an implementation. As illustrated, the data are organized based on their inline and cross line numbers in a rectangle box. The width of the length represents the inline directions of the data. The length of the box represents the cross line directions of the data. The data are then grouped into blocks along the cross line directions. The size of the cross line direction for each block is determined based on the memory size for processing the block. In some cases, the raw data does not fit in a regular rectangle box, e.g., some data are missing in one or more blocks. In these or other cases, the raw data are regularized. For example, additional data with the value 0 can be added for each block to make the data in each block form a rectangle box.

In some cases, edge artifacts may be introduced by the segmentation of data into blocks and the processing of individual blocks. To smooth out these edge artifacts, the output data for each block is generated by processing a buffer block of data that includes data from adjacent blocks. In these or other cases, the size of each block is determined based on the memory size needed to process the data in a buffer block. For example, as shown in FIG. 3, the set of raw data is grouped into 4 blocks, block-1 302, block-2 304, block-3 306, and block-4 308 along the cross line direction. When block-1 302 is processed, the data in buffer block 1 input 312 is used as input. The buffer block 1 input 312 includes data in the block-1 302 and data in the upper portion of the adjacent block-1 304. The optimization process can generate output data in block 1 output 322, which is the same size as the block-1 302. The data in buffer block-2 input 314 is used as input to produce output data in block-2 output 324. The buffer block-2 input 314 includes data in the block-2 304, data in the lower portion of the adjacent block-1 302, and data in the upper portion of the adjacent block-3 306. Similarly, the data in buffer block-3 input 316 and buffer block-4 input 318 are used as inputs to produce output data in block-3 output 326 and block-4 output 328, respectively. In some cases, the size of the last block in the set can be smaller than other blocks.

Figure 4:
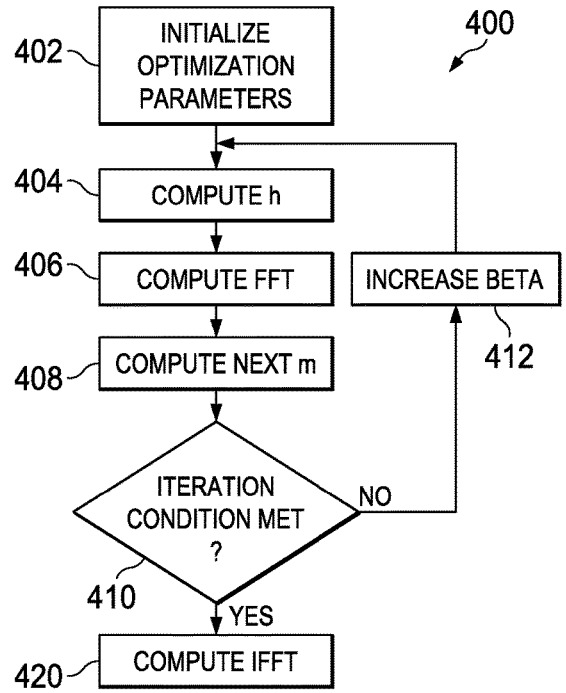
FIG. 4 illustrates an example method of processing a block of geophysical data using 3D norm zero function according to an implementation.

Referring to FIG. 1, from 108, method 100 proceeds to 110, where each block, or a buffer block as discussed above, of raw data is processed based on a 3D norm zero optimization process. FIG. 4 and associated description provides additional details of these implementations. From 110, method 100 proceeds to 112.

At 112, the smoothed data for each block is outputted into an output file. In some cases, the output data can be stored in a SEGY file. In some cases, the output data is de-regularized. In a de-regularization process, the size of output data for each block is restored to the original size of the input data. For example, if a number of additional data is added to make the data fit into a regular rectangle box in a block, the same number of output data is removed. The optimization step at 110 and the output step at 112 are repeated until the last block of data in the set is processed.

FIG. 4 illustrates an example method 400 of processing a block of geophysical data using 3D norm zero function according to an implementation. For clarity of presentation, the description that follows generally describes method 400 in the context of FIGS. 1-3 and 5-11. However, it will be understood that method 400 may be performed, for example, by any other suitable system, environment, software, and hardware, or a combination of systems, environments, software, and hardware as appropriate. In some implementations, various steps of method 400 can be run in parallel, in combination, in loops, and/or in any order.

In some cases, the 3D norm zero function can be solved in a two-step iterative process. The following represents the 3D norm zero objective energy function to be solved:

$$obj = \sum_{x=1}^{k} \left( (d(x) - m(x))^2 + \lambda \cdot \sum_{i=1}^{3} C\left(\frac{\partial m(x)}{\partial x_i} \neq 0\right) \right) \quad (8)$$

where $d(x)$ enumerates k samples of 3D raw data, where $x \in R^3$; i enumerates the dimension of the raw data; $m(x)$ represents the smooth version of the data; $C(\ )$ represents the $l_0$ function, which is a counting function that returns 0 if the input of the function is zero and returns 1 if the input of the function is not zero; $\lambda$ represents a constant weight; and x enumerates all the pixels in the image.

The above function is neither smooth nor continuous and, therefore, not directly solvable if by close form or gradient based methods. To approximate the solution, an auxiliary variables $\{h_i\}$ is introduced. The following represents a definition of the auxiliary variables $\{h_i\}$:

$$h_i \to \frac{\partial m}{\partial x_i} \quad (9)$$

Therefore, the objective energy function can be rewritten in the following:

$$obj = \sum_{x=1}^{k} \left( (d(x) - m(x))^2 + \beta \cdot \sum_{i=1}^{3} \left( h_i(x) - \frac{\partial m(x)}{\partial x_i} \right)^2 + \lambda \cdot \sum_{i=1}^{3} C(h_i(x) \neq 0) \right)$$

(10)

When the beta value $\{\beta\}$ is large enough, the auxiliary variables $\{h_i\}$ approach the derivative of $m(x)$. Thus, the model in the equation (10) approaches equation (8).

It may be difficult to analytically solve equation (10) because the two terms $m(x)$ and $h(x)$ model respectively the pixel-wise difference and global discontinuity statistically and, thus, are not suitable for traditional gradient descent or other discrete optimization methods. In some cases, an alternating optimization solution with half-quadratic splitting can be used. The solution can be performed in a loop of two alternating steps using an iteration approach: First, fix m and solve for h; and second, fix h and solve for m. Then, the value of $\beta$ is increased before entering the next iteration. The iteration loop continues until an iterative condition is met. The following descriptions provide additional details of these implementations.

Referring to FIG. 4, at 402, the parameters for the optimization process are initialized. The parameters can include an initial beta value $\beta$. For example, $\beta$ can be initialized to 0.5. The parameters can also include a cut off ratio P. In some cases, a cut off ratio of 0.5 can create a minor smoothing effect, while a cut off ratio of 0.95 can generate heavily smoothed and blocky data. The parameters can also include the iterative condition. For example, the iterative condition can include a maximum number of iterations, a maximum number of $\beta$, a smoothing quality of the output data, or a combination of both. In some cases, some or all of the parameters can be initialized one time for raw data in different blocks or different traces; therefore, the same initiation values can be used. Alternatively or additionally, the parameters can be initialized each time the raw data in different blocks or traces are processed; therefore, different initiation values can be used. In some cases, the initial value of the output data $m(x)$ can be set to $d(x)$. In these or other cases, the derivative operator $$\frac{\partial m(x)}{\partial x_i}$$

is also computed. From 402, method 400 proceeds to 404.

At 404 auxiliary variables $\{h_i\}$ is computed. In this step, m is fixed, and h can be solved using a sub energy optimization function described as the following:

$$\arg\{\min_{h}\} = \quad (11)$$

$$\sum_{x=1}^{k} \left( \beta \cdot \sum_{i=1}^{3} \left( h_i(x) - \frac{\partial m(x)}{\partial x_i} \right)^2 + \lambda \cdot \sum_{i=1}^{3} C(h_i(x) \neq 0) \right)$$

The following represents the solution h:

$$\begin{cases} h_i(x) = \frac{\partial m(x)}{\partial x_i} & \text{if } \frac{\partial m(x)}{\partial x_i} \geq \frac{\lambda}{\beta} \\ h_i(x) = 0 & \text{otherwise} \end{cases} \quad (12)$$

This step removes small gradients and keeps the larger ones for future iterations. As illustrated in the equation, the power threshold $\lambda/\beta$ can control the sparseness of the rock interfaces. A larger value $\lambda/\beta$ can produce a blockier result. From 406, method 400 proceeds to 408.

In some cases, the constant weight $\lambda$ can be computed by multiplying the cutoff ratio P and the power of $$\frac{\partial m(x)}{\partial x_i}.$$

The power of $$\frac{\partial m(x)}{\partial x_i}$$

can be computed as following:
power of $$\frac{\partial m(x)}{\partial x_i} = \frac{\partial m(x)}{\partial x_1} * \frac{\partial m(x)}{\partial x_1} + \frac{\partial m(x)}{\partial x_2} * \frac{\partial m(x)}{\partial x_2} + \frac{\partial m(x)}{\partial x_3} * \frac{\partial m(x)}{\partial x_3}$$

where $x1, x2, x3$ represents 3D space coordinate directions. From 404, method 400 proceeds to 406.

At 406, 3D discrete Fourier transform of the input data m(x) and the auxiliary variables {$h_i$} are computed. As discussed in more detail below, the 3D discrete Fourier transform of the input data and the directive operators can be used to solve the frequency domain version of the function. In some cases, the 3D discrete Fourier transform can be performed using FFT. From 404, method 400 proceeds to 406.

At 408, the next m is computed. In this step, h is fixed; therefore, m can be solved using another sub energy optimization function described as the following:

$$\arg\{\min_m\} = \sum\nolimits_{x=1}^{k} ((d(x) - m(x))^2 + \beta \cdot \sum\nolimits_{i=1}^{3} \left(h_i(x) - \frac{\partial m(x)}{\partial x_i}\right)^2 \quad (13)$$

According to Parseval's theorem, the energy in the time domain is equal to the energy in the frequency domain. Therefore, a Fourier transform can be applied to equation 10 to yield an object function in the frequency domain as described below:

$$\arg\{\min_M\} = \Sigma_{x=1}^{k}((D-M)^2 + \beta \cdot \Sigma_{i=1}^{3}(H_i - W_i^T \cdot M)^2) \quad (14)$$

where D, M, {$H_i$} represents the n-dim discrete Fourier transform of input data d, smoothed data m and auxiliary variables {$h_i$}, the input $W_i$ represents the 3D discrete Fourier transform of partial derivative operation along i-th dimension, $W_i^T$ is the conjugation of $W_i$.

This problem has a close form solution described below:

$$M = \frac{D + \beta \cdot \sum_{i=1}^{3}(W_i^T \cdot H_i)}{1 + \beta \cdot \sum_{i=1}^{3}(W_i^T \cdot W_i)} \quad (15)$$

From 408, method 400 proceeds to 410, where an iterative condition is checked to determine whether the iterative condition has been met. As discussed above, the iterative condition can include a maximum number of iterations, a maximum number of β, a smoothing quality of the output data, or a combination of both. For example, the maximum number of iterations can be set to 5, or 8-10; the iteration can be determined if the number of iterations is equal to the maximum number of iterations. In some cases, the number of iterations affects the flatness between rock interfaces. For example, more iterations can result more flatness between rock interfaces. In some cases, the smoothing quality can be determined by empirical trial and testing. In some cases, the objective function may converge when β becomes large. In some cases, the smoothed output of each iteration may be examined to determine whether the results converges. In one example, the smoothed output does not change much after 10 iterations, and therefore 10 iterations may correspond to a predetermined smoothing quality. In some cases, the number of iterations may increase if the smoothing quality of the output is not satisfactory.

If the iterative condition is not met, method 400 proceeds from 410 to 412, where the beta value is increased. In some cases, the beta value can double in each iteration. From 412, method 400 proceeds to 404, where the next h is computed. If the iterative condition is met, method 400 proceeds from 410 to 420.

At 420, the final output data m(x) is calculated by the inverse discrete Fourier transform of M. The inverse discrete Fourier transform can be performed using inverse FFT (IFFT).

Figure 5:
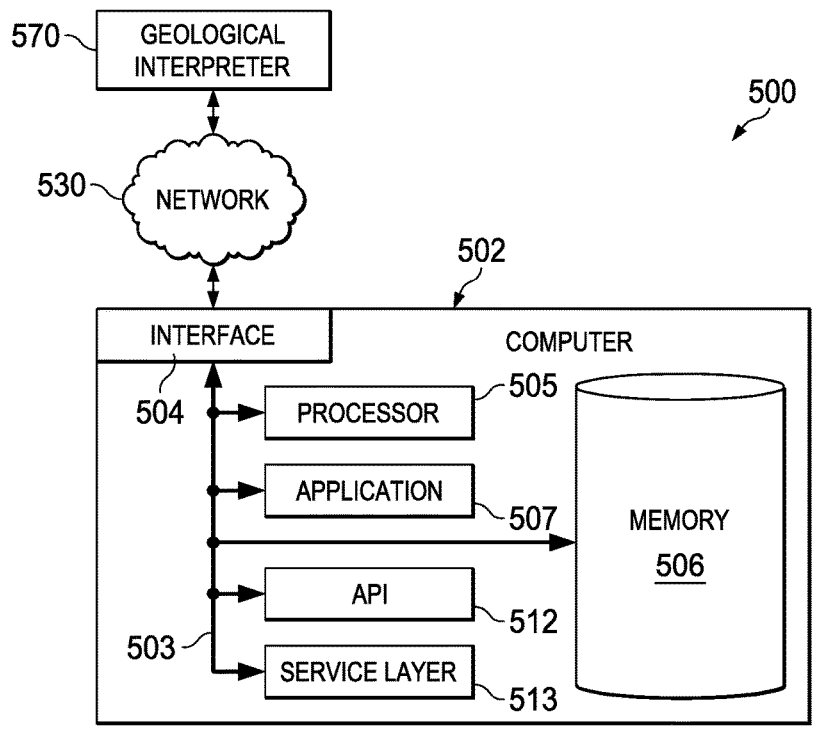
FIG. 5 is a high-level architecture block diagram of a geophysical data processing system according to an implementation.

FIG. 5 is a high level architecture block diagram of a geophysical data processing system 500 according to an implementation. At a high level, the illustrated system 500 includes a geological interpreter 570 that is communicably coupled with a geophysical data processing computer 502 through a network 530. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The geological interpreter 570 represents a person, an application, set of applications, software, software modules, hardware, or combination thereof that can be used to analyze the smoothed geophysical data and build reservoir model based on the smoothed data. In some cases, the geological interpreter 570 can also set the initialization parameters of the 3D norm zero optimization process discussed above.

The network 530 facilitates communications between the components of the system 500 (e.g., between the geological interpreter 570 and the geophysical data processing computer 502). In some cases, the geological interpreter 570 can access the geophysical data processing computer 502 from a remote network. In these or other cases, the network 530 can be a wireless or a wireline network. In some cases, the geological interpreter 570 can access the geophysical data processing computer 502 locally. In these or other cases, the network 530 can also be a memory pipe, a hardware connection, or any internal or external communication paths between the components.

The geophysical data processing computer 502 includes a computing system configured to process the geophysical data using the 3D norm zero optimization process. In some cases, the algorithm of the 3D norm zero optimization process can be implemented in an executable computing code, e.g., C/C++ executable codes. In some cases, the geophysical data processing computer 502 can include a standalone Linux system that runs batch applications. In some cases, the geophysical data processing computer 502 can include mobile or personal computers that have sufficient memory size to process each block of the geophysical data.

The computer 502 may comprise a computer that includes an input device, such as a keypad, keyboard, touch screen, microphone, speech recognition device, other device that can accept user information, and/or an output device that conveys information associated with the operation of the computer 502, including digital data, visual and/or audio information, or a GUI.

The computer 502 can serve as a client, network component, a server, a database or other persistency, and/or any other component of the system 500. In some implementations, one or more components of the computer 502 may be configured to operate within a cloud-computing-based environment.

At a high level, the computer 502 is an electronic computing device operable to receive, transmit, process, store, or manage data and information associated with the system 500. According to some implementations, the computer 502 may also include or be communicably coupled with an application server, e-mail server, web server, caching server, streaming data server, business intelligence (BI) server, and/or other server.

The computer 502 can receive requests over network 530 from a client application (e.g., executing on another computer 502) and respond to the received requests by processing the said requests in an appropriate software application. In addition, requests may also be sent to the computer 502 from internal users (e.g., from a command console or by another appropriate access method), external or third parties, other automated applications, as well as any other appropriate entities, individuals, systems, or computers.

Each of the components of the computer 502 can communicate using a system bus 503. In some implementations, any and/or all the components of the computer 502, both hardware and/or software, may interface with each other and/or the interface 504 over the system bus 503 using an application programming interface (API) 512 and/or a service layer 513. The API 512 may include specifications for routines, data structures, and object classes. The API 512 may be either computer language-independent or -dependent and refer to a complete interface, a single function, or even a set of APIs. The service layer 513 provides software services to the computer 502 and/or the system 500. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in Extensible Markup Language (XML) format or other suitable format. While illustrated as an integrated component of the computer 502, alternative implementations may illustrate the API 512 and/or the service layer 513 as stand-alone components in relation to other components of the computer 502 and/or system 500. Moreover, any or all parts of the API 512 and/or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502 and/or system 500. The interface 504 is used by the computer 502 for communicating with other systems in a distributed environment—including within the system 500—connected to the network 530 (whether illustrated or not). Generally, the interface 504 comprises logic encoded in software and/or hardware in a suitable combination and operable to communicate with the network 530. More specifically, the interface 504 may comprise software supporting one or more communication protocols associated with communications such that the network 530 or interface's hardware is operable to communicate physical signals within and outside of the illustrated system 500.

The computer 502 includes a processor 505. Although illustrated as a single processor 505 in FIG. 5, two or more processors may be used according to particular needs, desires, or particular implementations of the computer 502 and/or the system 500. Generally, the processor 505 executes instructions and manipulates data to perform the operations of the computer 502. Specifically, the processor 505 executes the functionality required for processing geophysical data.

The computer 502 also includes a memory 506 that holds data for the computer 502 and/or other components of the system 500. Although illustrated as a single memory 506 in FIG. 5, two or more memories may be used according to particular needs, desires, or particular implementations of the computer 502 and/or the system 500. While memory 506 is illustrated as an integral component of the computer 502, in alternative implementations, memory 506 can be external to the computer 502 and/or the system 500.

The application 507 is an algorithmic software engine providing functionality according to particular needs, desires, or particular implementations of the computer 502 and/or the system 500, particularly with respect to functionality required for processing geophysical data. For example, application 507 can serve as one or more components/applications described in FIGS. 1-4 and 6-11. Further, although illustrated as a single application 507, the application 507 may be implemented as multiple applications 507 on the computer 502. In addition, although illustrated as integral to the computer 502, in alternative implementations, the application 507 can be external to the computer 502 and/or the system 500.

There may be any number of computers 502 associated with, or external to, the system 500 and communicating over network 530. Further, the terms "client," "user," and other appropriate terminology may be used interchangeably as appropriate without departing from the scope of this disclosure. Moreover, this disclosure contemplates that many users may use one computer 502, or that one user may use multiple computers 502.

Figure 6A:
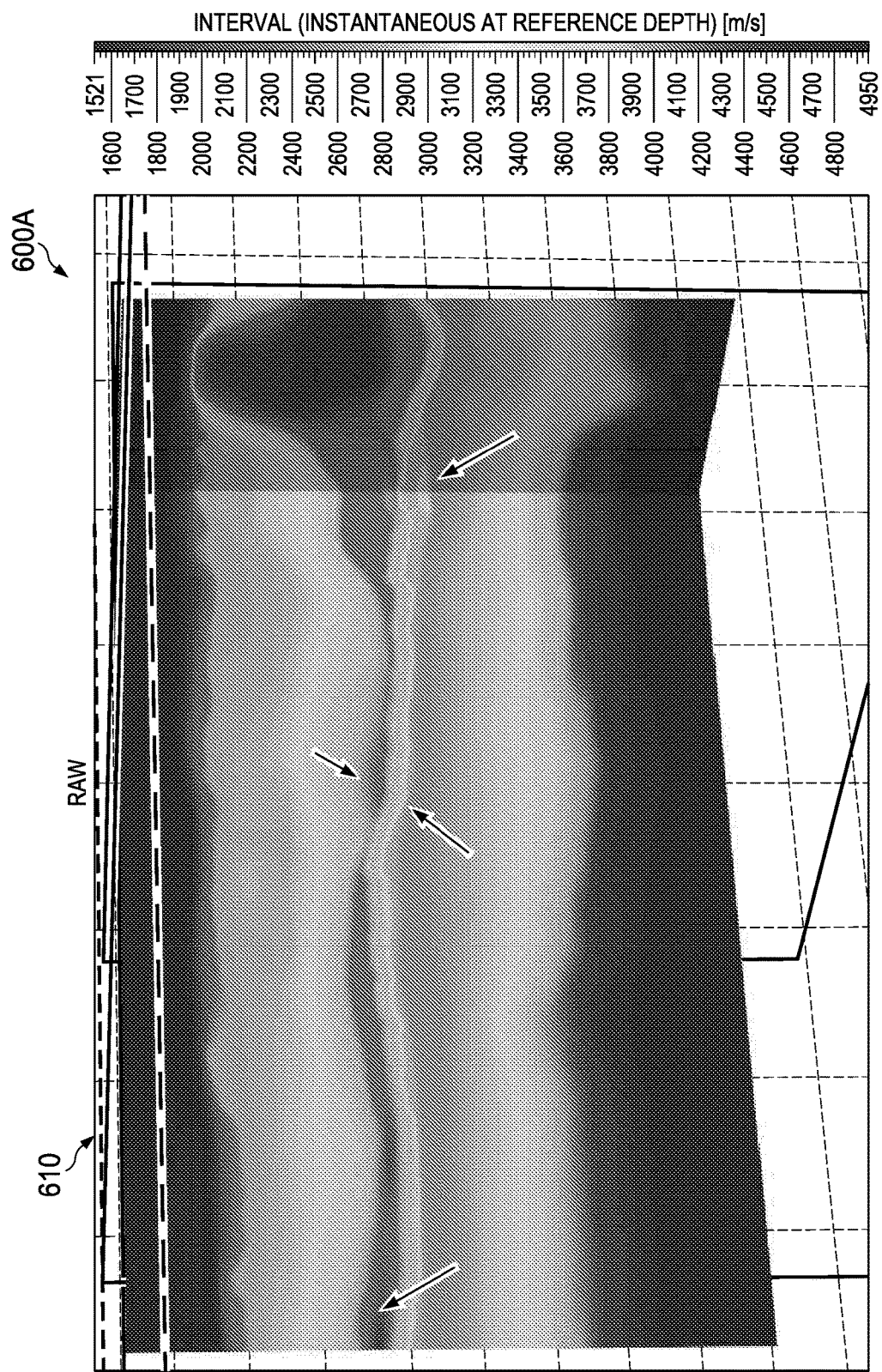
FIGS. 6A & 6B are example screenshots which illustrate velocity data according to an implementation.
Figure 6B:
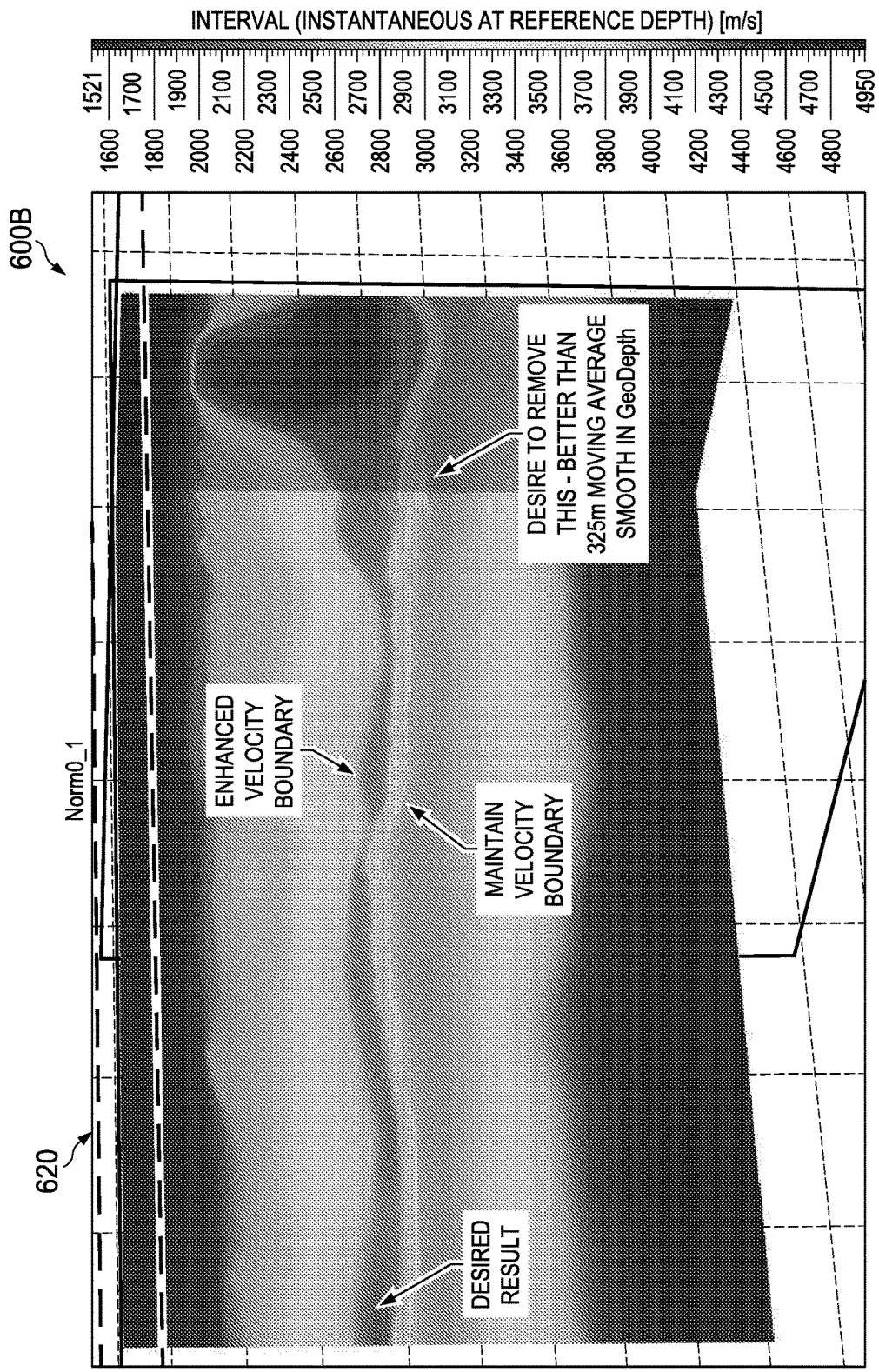

FIGS. 6A & 6B are example screenshots 600a & 600b, respectively, which illustrate velocity data according to an implementation. Screenshot 600a (in FIG. 6A) includes raw velocity data 610 and screenshot 600b (in FIG. 6B) includes smoothed velocity data 620. The velocity data 610 and 620 show a complex velocity model with changing contrast and boundary. As illustrated, the smoothed velocity data 620 in FIG. 6B that is produced by the norm zero smoothing process removes small anomalies, keeps major boundary (edge preserve) while enhancing the boundary variations (gradual change of boundary). Although screenshots 600a and 600b of FIGS. 6A and 6B, respectively, are illustrated in grayscale, in other implementations, the screenshots 600a and 600b can display the appropriate velocity data 610 and 620 in various layers of color, such as red, orange, yellow, green, blue, indigo, violet, and the like, and the like to help clearly distinguish different data layers.

Figure 7A:
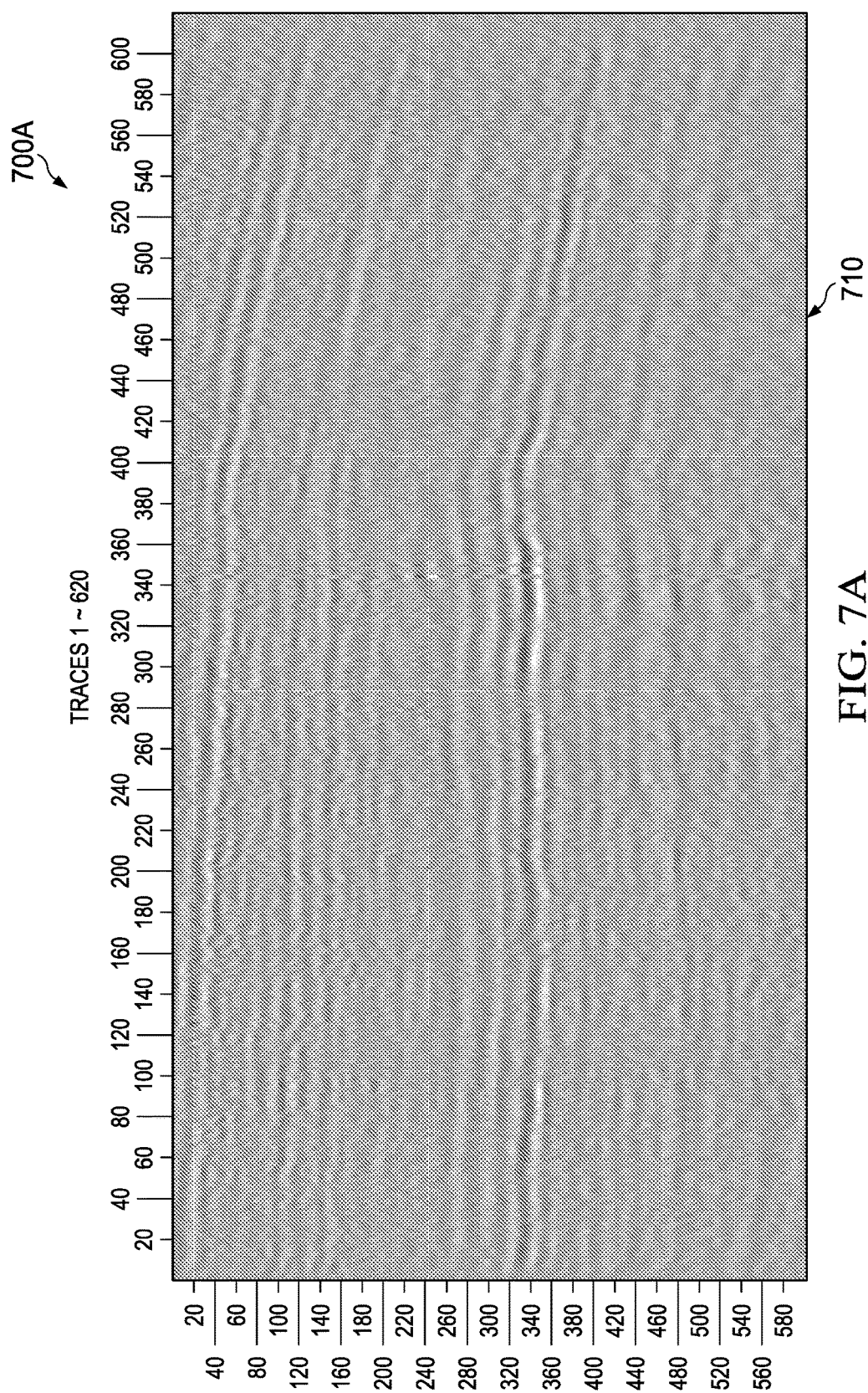
FIGS. 7A & 7B are example screenshots which illustrate an inline section view of a 3D seismic survey according to an implementation.
Figure 7B:
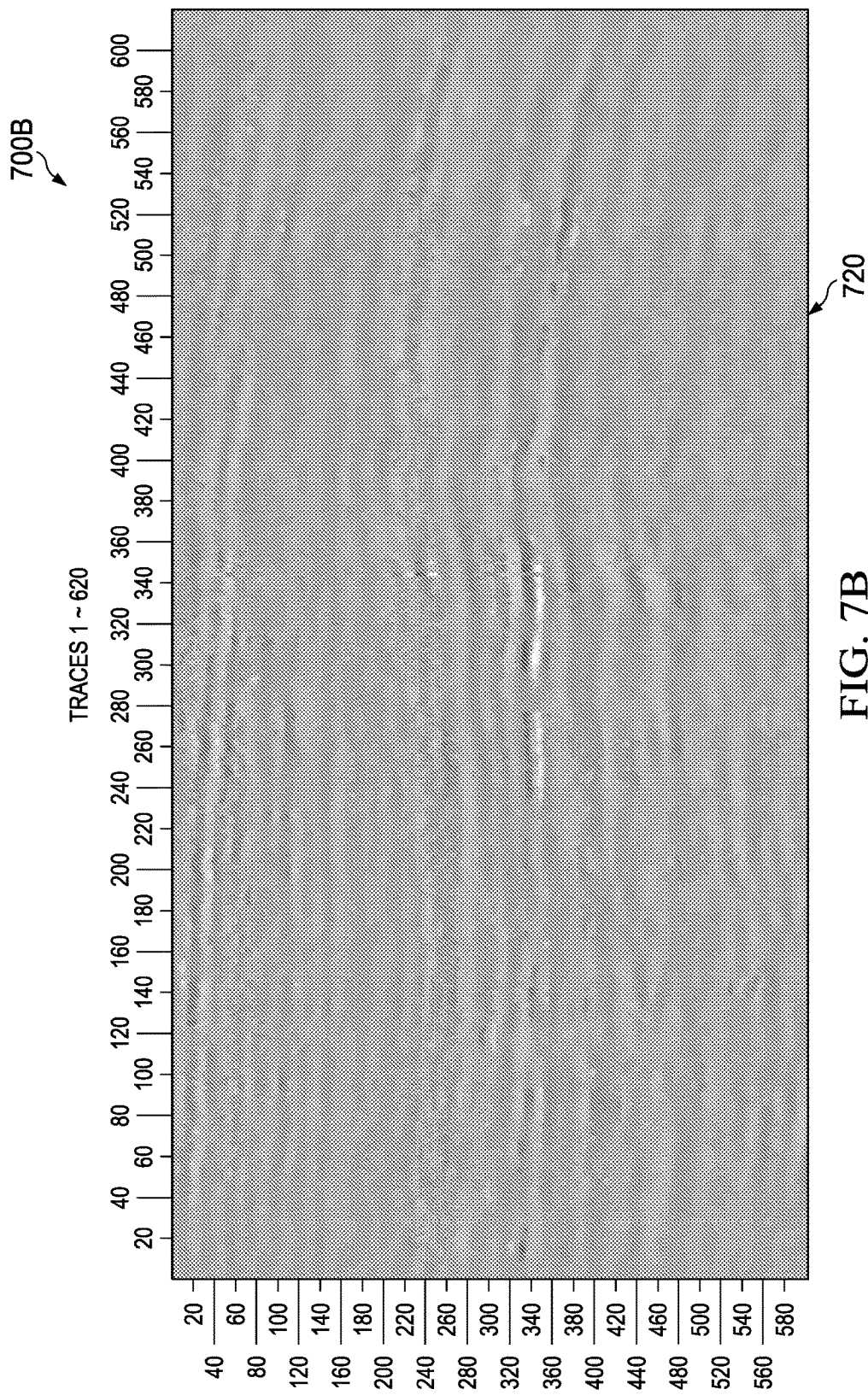

FIGS. 7A & 7B are example screenshots 700a & 700b, respectively, which illustrate an inline section view of a 3D seismic survey according to an implementation. Screenshot 700a includes a raw data view 710 and Screenshot 700b includes a smoothed data view 720. The views 710 and 720 represent recorded reflection seismic curves. As illustrated in FIG. 7B, after norm zero optimization, the major reflection layers are kept but the small events between layers have been smoothed out. Therefore, in some cases, the norm-zero optimization process may improve sparse and layered data. However, the process may not be suitable to preserve small variations such as inter-bed reflections or thin layers.

Figure 8A:
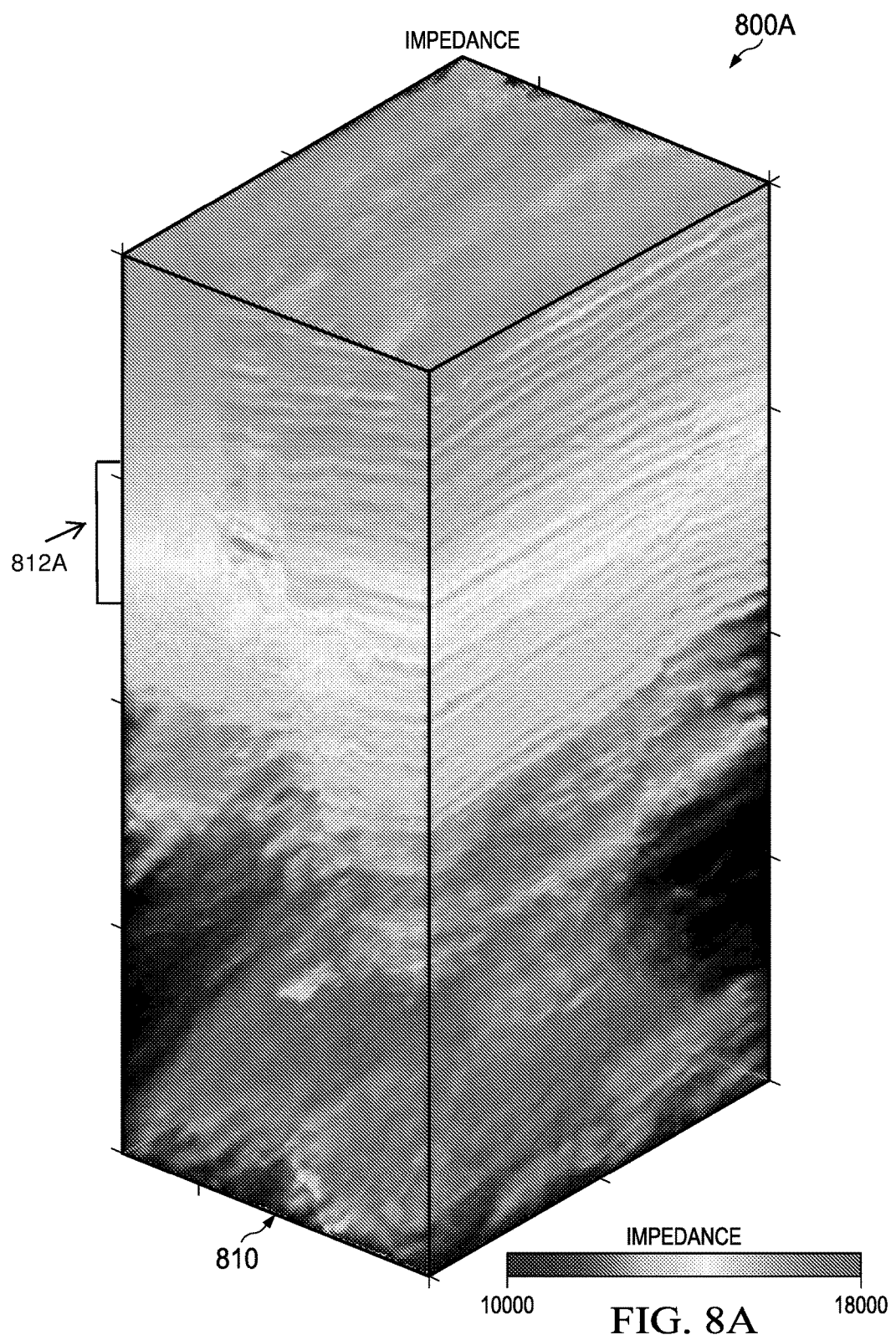
FIGS. 8A & 8B are example screenshots which illustrate a 3D volume view of an acoustic impedance model according to an implementation.
Figure 8B:
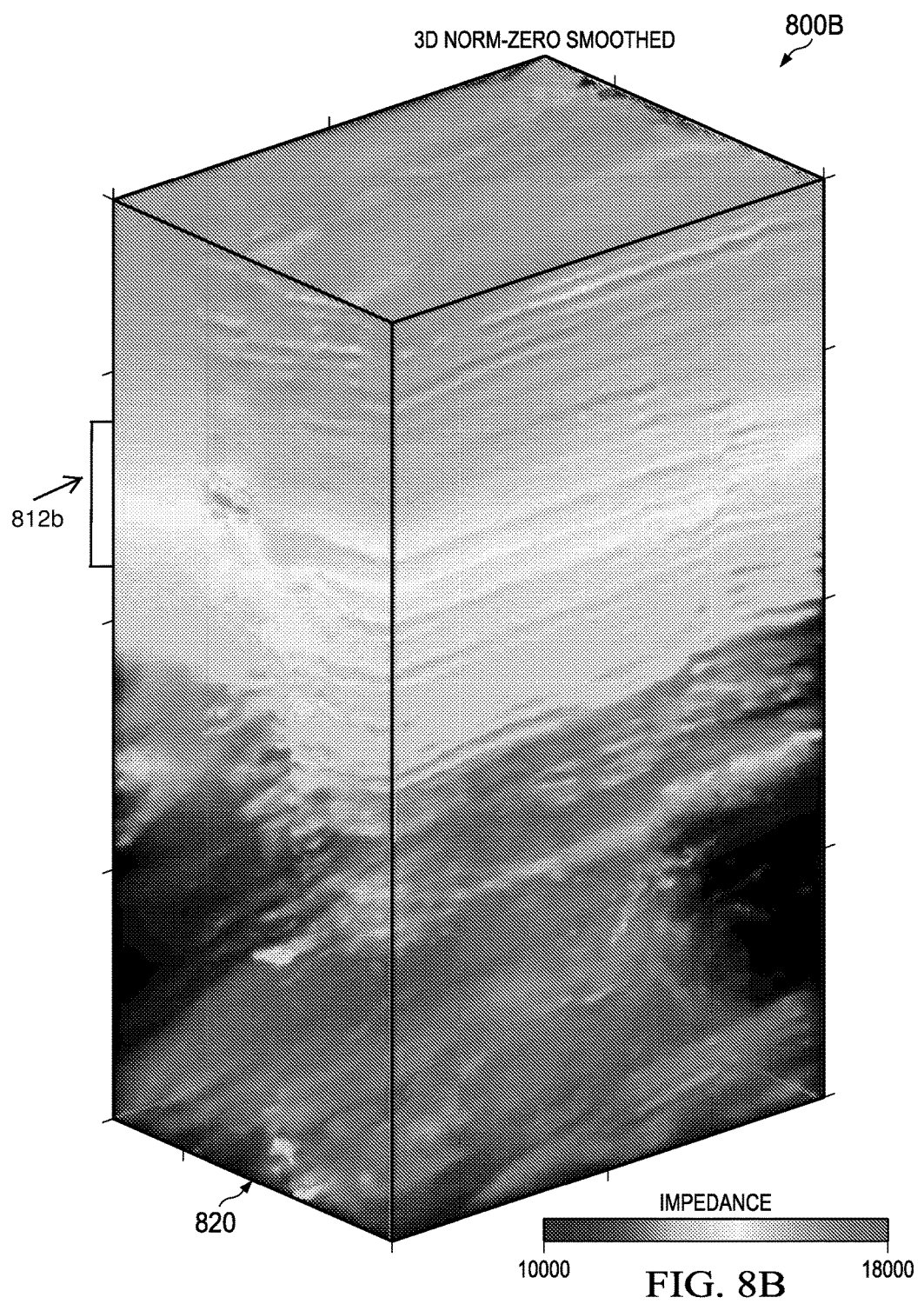

FIGS. 8A & 8B are example screenshots 800a & 800b, respectively, which illustrate a 3D volume view of an acoustic impedance model according to an implementation. Screenshot 800a includes an impedance model 810 obtained based on raw data and screenshot 800b includes an impedance model 820 obtained based on data smoothed by 3D norm zero optimization. A zone 812a in FIG. 8A displays rough layers and defined edges. The optimization parameters include a cut off ratio of 80%, 5 iterations, and a beta value of 0.5. As illustrated in FIG. 8B, after 3D norm zero smoothing, the layers of zone 812b are smooth and changes between layers are gradual with better continuation and clarity. Therefore, the 3D norm zero smoothing improves the event continuities while preserving edges and suppressing the undesired non-major events. In some implementations, the impedance model 810 and 820 can be displayed in various colors, such as red, orange, yellow, green, blue, indigo, violet and the like, based on impedance data, to help clearly distinguish different data layers. For example, impedance data around a value of 10000 can be displayed in indigo/violet while impedance data of around a value of 18000 can be in red. The zone 812a in FIG. 8A can be displayed in yellow to indicate impedance data of values between about 14000 and 16000.

Figure 9A:
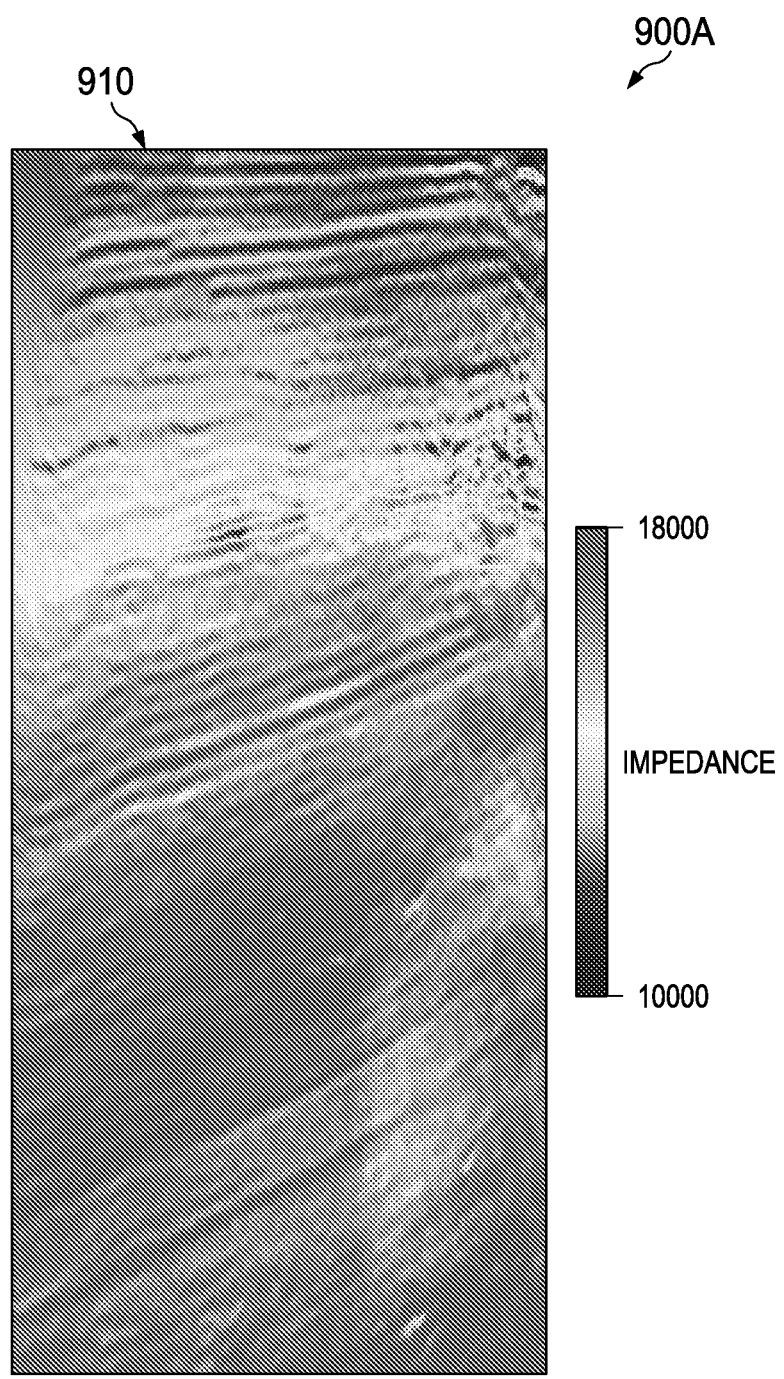
FIGS. 9A & 9B are example screenshots which illustrate a 2D section view of an acoustic impedance model according to an implementation.
Figure 9B:
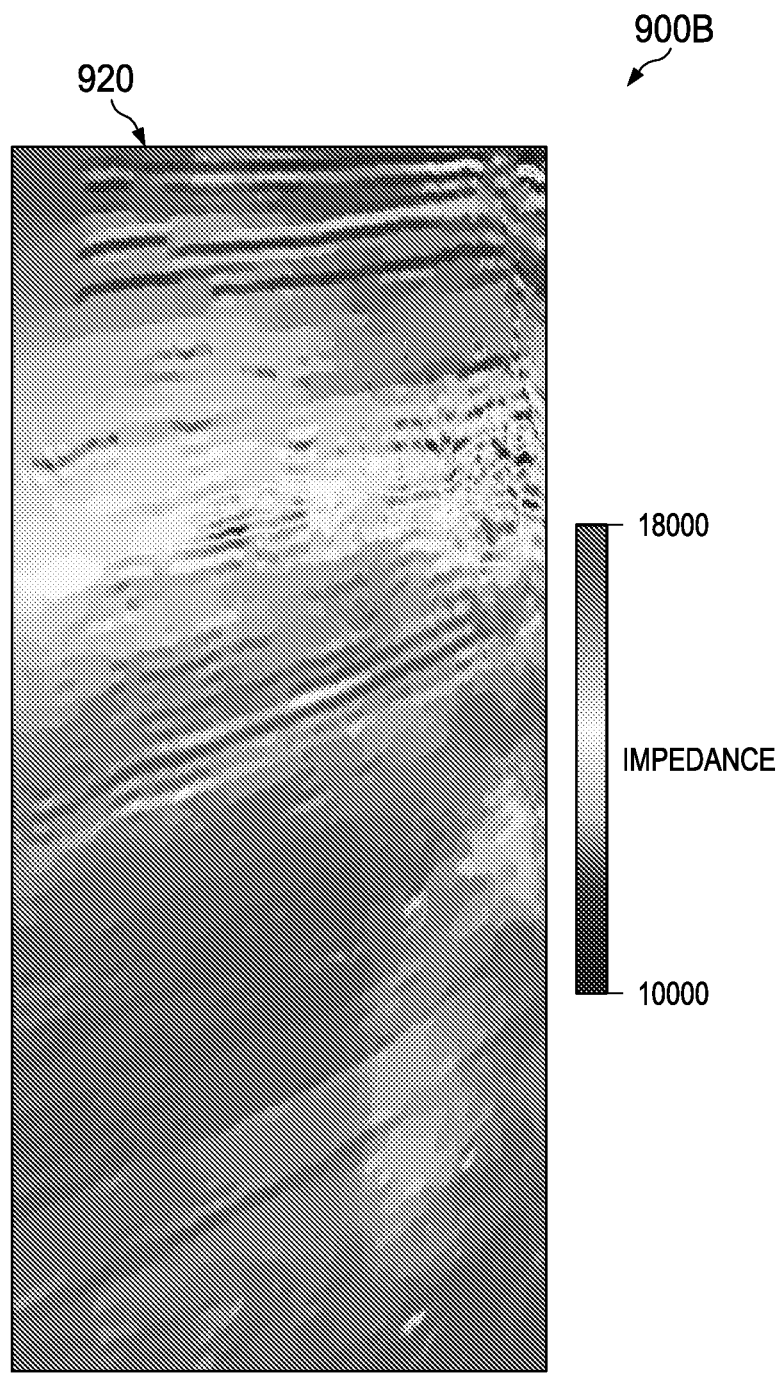

FIGS. 9A & 9B are example screenshots 900a & 900b, respectively, which illustrate a 2D section view of an acoustic impedance model according to an implementation. The screenshot 900a includes a vertical directional view of the impedance model 910 obtained based on raw data and screenshot 900b includes a vertical directional view of the impedance model 920 obtained based on data smoothed by 3D norm zero optimization. Both views show the inline direction at one of the sublines. As illustrated, the 3D norm zero smoothing suppresses low amplitude images and provides better lateral variation layers. In some implementations, the impedance model 910 and 920 can be displayed in various colors, such as red, orange, yellow, green, blue, indigo, violet, and the like, based on impedance data, to help clearly distinguish different data layers. For example, impedance data of around a value of 10000 can be displayed in indigo/violet while impedance data of around a value of 18000 can be in red.

Figure 10A:
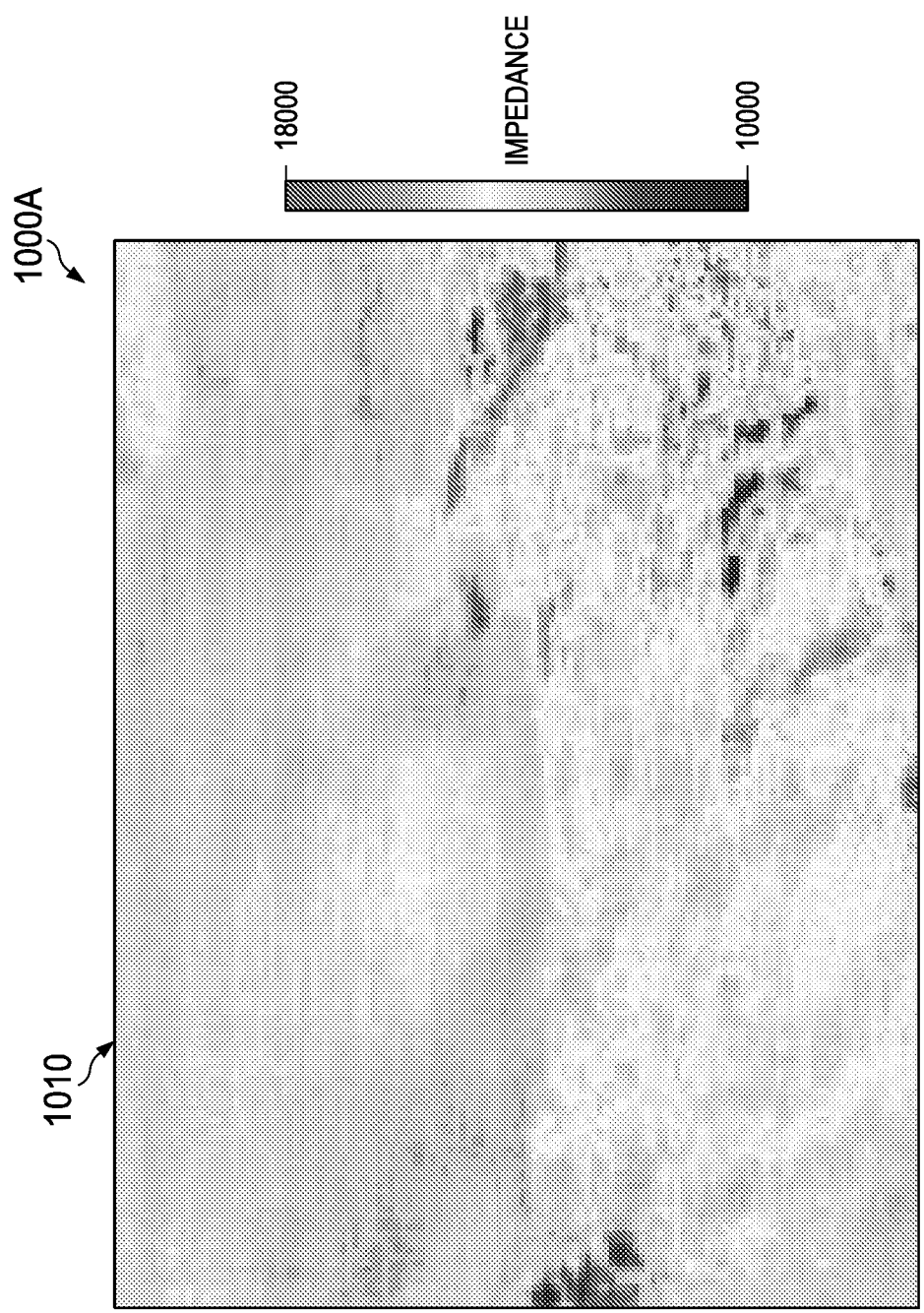
FIGS. 10A & 10B are example screenshots which illustrate a time slice view of an acoustic impedance model according to an implementation.
Figure 10B:
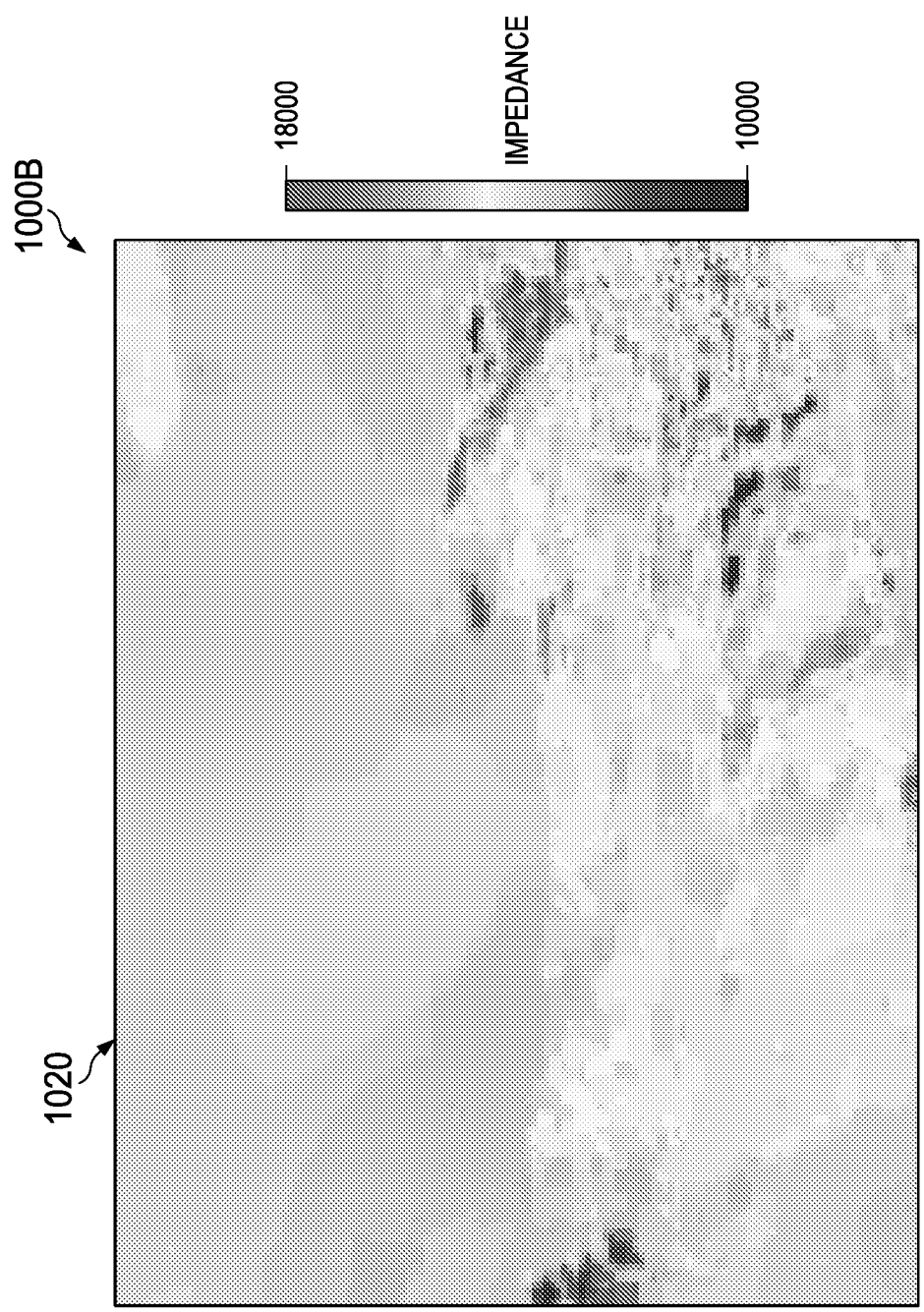

FIGS. 10A & 10B are example screenshots 1000a & 1000b, respectively, which illustrate a time slice view of an acoustic impedance model according to an implementation. The screenshot 1000a includes a time slice view of the impedance model 1010 obtained based on data smoothed by JASON software and screenshot 1000b includes a time slice view of the impedance model 1020 obtained based on data smoothed by 3D norm zero optimization. Both time slice views represent 444 MS. As illustrated, the 3D norm zero smoothing provides more natural varied changes that describe the subsurface geological information. In some implementations, the impedance model 1010 and 1020 can be displayed in various colors, such as red, orange, yellow, green, blue, indigo, violet, and the like, based on impedance data, to help clearly distinguish different data layers. For example, impedance data of around a value of 10000 can be displayed in indigo/violet while impedance data of around a value of 18000 can be in red.

Figure 11A:
FIGS. 11A & 11B are example screenshots which illustrate a porosity model according to an implementation.
Figure 11B:
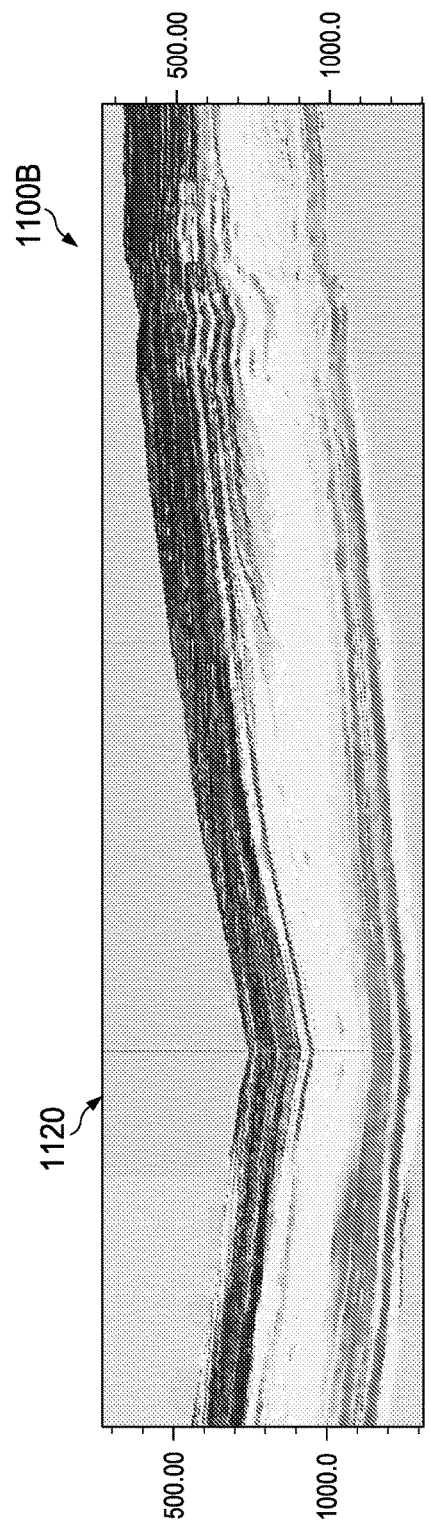

FIGS. 11A & 11B are example screenshots 1100a & 1100b, respectively, which illustrate a porosity model according to an implementation. In some cases, geological interpretation can concentrate on a range of horizons where major geological layers (events) are present. In these or other cases, porosity can be computed from geophysical data of the interest zone to analyze the hydrocarbon mobility. The illustrated porosity model 1110 in FIG. 11A represents a zone of subline (110~696), cross line (302~1193), and time (0.5~1.2 second) of a porosity model that is obtained by using support vector machine inversion out of a suit of seismic attributes in Saudi Arabia; and the porosity model 1120 in FIG. 11B is obtained based on the same inversion techniques using smoothed data. As illustrated, the porosity model 1120 is more consistent, and both the vertical and horizon gradient change becomes small and continuous compared to the model 1110. In some implementations, the screenshot 1100a and 1100b can display the porosity model 1110 and 1120 in various colors, such as red, orange, yellow, green, blue, indigo, violet, and the like to help clearly distinguish different data layers.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A method for estimating subsurface structure of a reservoir based on raw geophysical data of the reservoir, comprising:
    obtaining a set of raw geophysical data of the reservoir, wherein the raw geophysical data include 3-dimensional (3D) coordinates;
    grouping, by a data processing apparatus, the set of the raw geophysical data into a plurality of subsets, wherein the grouping the set of the raw geophysical data comprises:
        determining geometry information for the set of the raw geophysical data;
        determining a memory size of a hardware memory that is used for processing one subset of the plurality of subsets of the raw geophysical data, wherein the hardware memory is coupled with the data processing apparatus; and
        grouping the set of the raw geophysical data based on the geometry information and the memory size of the hardware memory;
    processing, by the data processing apparatus, each subset of the raw geophysical data using a 3D norm zero objective energy function to generate a subset of smoothed geophysical data, wherein the smoothed geophysical data is used to build a subsurface model of the reservoir, wherein the 3D norm zero objective energy function is $$obj = \sum_{x=1}^{k} \left( (d(x) - m(x))^2 + \lambda \cdot \sum_{i=1}^{3} C\left( \frac{\partial m(x)}{\partial x_i} \neq 0 \right) \right),$$

where $d(x)$ represents the subset of the raw geophysical data, $k$ represents a number of the raw geophysical data in the subset, $i$ represents a dimension of the raw geophysical data, $m(x)$ represents the subset of the smoothed geophysical data, $C(\ldots)$ represents a counting function, and $\lambda$ represents a constant weight, and wherein processing each subset of the raw geophysical data comprises iteratively performing the following steps until an iterative condition is met:
    computing an auxiliary value by solving a first sub energy function, wherein the first sub energy function is derived from the 3D norm zero objective energy function with a fixed value of an input data;
    computing a next input data by solving a second sub energy function, wherein the second sub energy function is derived from the 3D norm zero objective energy function with a fixed auxiliary value; and
    increasing a beta value that is included in the first and the second sub energy functions;
generating, by using the smoothed geophysical data, a migration image of the subsurface structure of the reservoir; and
estimating the subsurface structure of the reservoir based on the migration image.

2. The method of claim 1, wherein the raw geophysical data is at least one of impedance data, velocity data, or porosity data.

3. The method of claim 1, wherein the geometry information includes a cross line direction of the raw geophysical data.

4. The method of claim 1, wherein the iteration condition includes at least one of reaching a predetermined number of iterations or a beta value being over a predetermined threshold.

5. A system for estimating subsurface structure of a reservoir based on raw geophysical data of the reservoir, comprising:
    a memory; and
    at least one hardware processor interoperably coupled with the memory and configured to:
        obtain a set of raw geophysical data of the reservoir, wherein the raw geophysical data include 3-Dimensional (3D) coordinates;
        group, by a data processing apparatus, the set of the raw geophysical data into a plurality of subsets, wherein the at least one hardware processor configured to group the set of the raw geophysical data comprises the at least one hardware processor configured to:

determine geometry information for the set of the raw geophysical data;

determine a memory size of at least a portion of the memory that is used for processing a subset of the raw geophysical data by the data processing apparatus; and group the set of the raw geophysical data based on the geometry information and the memory size of at least the portion of the memory;

process, by the data processing apparatus, each subset of the raw geophysical data using a 3D norm zero objective energy function to generate a subset of smoothed geophysical data, wherein the smoothed geophysical data is used to build a subsurface model of the reservoir, wherein the 3D norm zero objective energy function is $$obj = \sum_{x=1}^{k}\left((d(x) - m(x))^2 + \lambda \cdot \sum_{i=1}^{3} C\left(\frac{\partial m(x)}{\partial x_i} \neq 0\right)\right),$$

where d(x) represents the subset of the raw geophysical data, k represents a number of the raw geophysical data in the subset, i represents a dimension of the raw geophysical data, m(x) represents the subset of the smoothed geophysical data, C( . . . ) represents a counting function, and λ represents a constant weight, and wherein the at least one hardware processor configured to process each subset of the raw geophysical data using the 3D norm zero objective energy function comprises the at least one hardware processor configured to iteratively performing the following steps until an iterative condition is met:

computing an auxiliary value by solving a first sub energy function, wherein the first sub energy function is derived from the 3D norm zero objective energy function with a fixed value of an input data;

computing a next input data by solving a second sub energy function, wherein the second sub energy function is derived from the 3D norm zero objective energy function with a fixed auxiliary value; and increasing a beta value that is included in the first and the second sub energy functions;

generate, by using the smoothed geophysical data, a migration image of the subsurface structure of the reservoir; and estimate the subsurface structure of the reservoir based on the migration image.

6. The system of claim 5, wherein the raw geophysical data is at least one of impedance data, velocity data, or porosity data.

7. The system of claim 5, wherein the geometry information includes a cross line direction of the raw geophysical data.

8. The system of claim 5, wherein the iteration condition includes at least one of reaching a predetermined number of iterations or a beta value being over a predetermined threshold.

9. A non-transitory, computer-readable medium storing computer-readable instructions for estimating subsurface structure of a reservoir based on raw geophysical data of the reservoir, the instructions executable by a computer and configured to:

obtain a set of raw geophysical data of the reservoir, wherein the raw geophysical data include 3-Dimensional (3D) coordinates;

group, by a data processing apparatus, the set of the raw geophysical data into a plurality of subsets, wherein the grouping the set of the raw geophysical data comprises:

determining geometry information for the set of the raw geophysical data;

determining a memory size of a hardware memory that is used for processing one subset of the plurality of subsets of the raw geophysical data, wherein the hardware memory is coupled with the data processing apparatus; and grouping the set of the raw geophysical data based on the geometry information and the memory size of the hardware memory;

process, by the data processing apparatus, each subset of the raw geophysical data using a 3D norm zero objective energy function to generate a subset of smoothed geophysical data, wherein the smoothed geophysical data is used to build a subsurface model of the reservoir, wherein the 3D norm zero objective energy function is $$obj = \sum_{x=1}^{k}\left((d(x) - m(x))^2 + \lambda \cdot \sum_{i=1}^{3} C\left(\frac{\partial m(x)}{\partial x_i} \neq 0\right)\right),$$

where d(x) represents the subset of the raw geophysical data, k represents a number of the raw geophysical data in the subset, i represents a dimension of the raw geophysical data, m(x) represents the subset of the smoothed geophysical data, C( . . . ) represents a counting function, and λ represents a constant weight, and wherein processing each subset of the raw geophysical data comprises iteratively performing the following steps until an iterative condition is met:

computing an auxiliary value by solving a first sub energy function, wherein the first sub energy function is derived from the 3D norm zero objective energy function with a fixed value of an input data;

computing a next input data by solving a second sub energy function, wherein the second sub energy function is derived from the 3D norm zero objective energy function with a fixed auxiliary value; and increasing a beta value that is included in the first and the second sub energy functions;

generate, by using the smoothed geophysical data, a migration image of the subsurface structure of the reservoir; and estimate the subsurface structure of the reservoir based on the migration image.

10. The medium of claim 9, wherein the raw geophysical data is at least one of impedance data, velocity data, or porosity data.

11. The medium of claim 9, wherein the geometry information includes a cross line direction of the raw geophysical data.

* * * * *